(12) United States Patent
Mizutani et al.

(10) Patent No.: US 8,374,504 B2
(45) Date of Patent: Feb. 12, 2013

(54) OPTICAL COMMUNICATION SYSTEM

(75) Inventors: Masahiko Mizutani, Yokohama (JP); Yoshihiro Ashi, Yokohama (JP); Shinya Sasaki, Koganei (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 573 days.

(21) Appl. No.: 12/444,280

(22) PCT Filed: Oct. 6, 2006

(86) PCT No.: PCT/JP2006/320108
§ 371 (c)(1),
(2), (4) Date: Apr. 3, 2009

(87) PCT Pub. No.: WO2008/044273
PCT Pub. Date: Apr. 17, 2008

(65) Prior Publication Data
US 2010/0086304 A1    Apr. 8, 2010

(51) Int. Cl.
*H04J 14/00* (2006.01)
*H04J 4/00* (2006.01)
*H04J 14/02* (2006.01)
*H04B 10/12* (2006.01)

(52) U.S. Cl. ............... 398/71; 398/78; 398/89; 398/140

(58) Field of Classification Search .................. None
See application file for complete search history.

(56) References Cited

U.S. PATENT DOCUMENTS 5,978,117 A * 11/1999 Koonen ............... 398/116
6,674,966 B1 * 1/2004 Koonen ............... 398/70
7,043,271 B1 5/2006 Seto et al.
7,133,353 B2 * 11/2006 Sourour et al. ............... 370/208

(Continued)

FOREIGN PATENT DOCUMENTS

JP    2001-86058 A    3/2001
JP    2001-156720 A    6/2001

(Continued)

OTHER PUBLICATIONS

ITU-T G.984.1, Gigabit-capable Passive Optical Networks (GPON): General Characteristics, Mar. 2003.

(Continued)

*Primary Examiner* — Kenneth N Vanderpuye
*Assistant Examiner* — Abbas H Alagheband
(74) *Attorney, Agent, or Firm* — Mattingly & Malur, PC

(57) ABSTRACT

A transmitting apparatus includes a plurality of code spreaders different in spreading code, a reception processing unit that selectively distributes transmission data to the plurality of code spreaders, a plurality of optical transmitters each of which that transmit a code-spread signal to an optical fiber as a CDMA optical signal of a carrier wavelength different from that of the other optical transmitters, and a signal multiplexing unit that selectively supplies outputs of the plurality of code spreaders to the plurality of optical transmitters. A receiving apparatus includes an optical receiver that receives a wavelength-division-multiplexed CDMA optical signal from the optical fiber, and a plurality of despreaders connected to the optical receiver and different in spreading code, wherein each of the despreaders reproduces a CDMA signal corresponding to its spreading code from an output signal of the optical receiver.

11 Claims, 11 Drawing Sheets

U.S. PATENT DOCUMENTS

| | | | |
|---|---|---|---|
| 7,502,563 B2 * | 3/2009 | Nozue et al. | 398/69 |
| 2004/0208537 A1 * | 10/2004 | Lee et al. | 398/41 |
| 2004/0223763 A1 * | 11/2004 | Lee et al. | 398/78 |
| 2005/0123300 A1 * | 6/2005 | Kim et al. | 398/84 |
| 2005/0129402 A1 * | 6/2005 | Kim et al. | 398/79 |
| 2006/0079290 A1 | 4/2006 | Seto et al. | |

FOREIGN PATENT DOCUMENTS

| | | |
|---|---|---|
| JP | 2002-185074 A | 6/2002 |
| JP | 2004-282742 A | 10/2004 |
| JP | 2004-336784 A | 11/2004 |
| WO | WO 02056517 A1 * | 7/2002 |

OTHER PUBLICATIONS

ITU-T G.984.2, Gigabit-capable Passive Optical Networks (GPON): Physical Media Dependent (PMD) layer specification, Mar. 2003.

ITU-T G.984.3, Gigabit-capable Passive Optical Networks (G-PON): Transmission convergence layer specification, Feb. 2004.

IEEE 802.3ah, CSMA/CD Access Method and Physical Layer Specification Amendment: Media Access Control Parameters, Physical Layers, and Management Parameters for Subscriber Access Networks, pp. 243-298, 2005.

* cited by examiner

FLOW ID TABLE 251

| FLOW ID (VID) ~2511 | SPREADING CODE NUMBER (CODE SPREADER ID) ~2512 |
|---|---|
| VID (1) | Code 1 |
| VID (2) | Code 2 |
| ⋮ | ⋮ |

(B)

WAVELENGTH ALLOCATION TABLE 252

| SPREADING CODE NUMBER ~2521 | CARRIER WAVELENGTH (OPTICAL TRANSMITTER ID) ~2522 |
|---|---|
| Code 1 | $\lambda 1$ |
| Code 2 | $\lambda 2$ |
| ⋮ | ⋮ |

ONT-DIF 20D

FLOW ID TABLE 151

| FLOW ID (VID) | SPREADING CODE NUMBER (CODE SPREADER ID) | ONT-ID |
|---|---|---|
| VID (1) | Code 1 | ONT (1) |
| VID (2) | Code 2 | ONT (2) |
| ⋮ | ⋮ | ⋮ |

ONT-UIF 20U

WAVELENGTH MANAGEMENT TABLE 253

| OPTICAL TRANSMITTER ID ~2531 | WAVELENGTH (CARRIER FREQUENCY) ~2532 | TARGET TEMPERATURE ~2533 |
|---|---|---|
| 1 | λ1 | T(1) |
| 2 | λ2 | T(2) |
| ⋮ | ⋮ | ⋮ |

OPTICAL COMMUNICATION SYSTEM

TECHNICAL FIELD

The present invention relates to an optical communication system, and more particularly to a multiplexed optical signal transmission system that enables receiving of optical transmission signals multiplexed on an optical fiber by a single optical receiving device.

BACKGROUND ART

Services on a network are diversified and new services taking advantage of the network are expanding. As a representative example, there is a merged service of broadcasting and communication, that is, an integration of broadcasting, Internet, and telephone (voice communication) services called triple services. This service is a representative application of existing information services, and triple play has become a keyword indicating the next-generation network concept to accommodate diversified information communication services.

In such circumstances, in access networks, construction of FTTH by PON (Passive Optical Network) becomes the mainstream. A PON system comprises an office side apparatus OLT (Optical Line Terminal) located in the office building of a communication carrier, and a plurality of subscriber connecting apparatus ONTs (Optical Network Terminals) each being located at a user home. Signals are distributed to individual homes in a point-to-multipoint form, by laying a single optical fiber (trunk optical fiber) from the OLT to a service area, diverging the trunk optical fiber into a plurality of branched optical fibers by a splitter and connecting each branched optical fiber to the ONT.

Since the PON system has the function of multicasting signals through optical branching, it is useful, for example, as an infrastructure for distributing large-capacity of data such as high-resolution images. Further, as a plurality of OLTs can share the trunk optical fiber, the PON system has an advantage that the costs of laying optical fibers and the number of transmitting/receiving devices in the OLT side can be reduced in comparison with a star-type connection in which the office building and each user home are connected in a point-to-point manner. Current PON systems include G (Gigabit-capable)-PON of the ITU-T standard (Non-patent Documents 1 to 3) and GE (Gigabit-Ethernet)-PON of the IEEE standard (Non-patent Document 4).

During the expansion of merged services of broadcasting and communication attracting attention, a further increase in communication density (higher-level multiplexing), an increase in communication speed (high bit rate), and expansion of fiber laying area are demanded for PON systems in order to distribute high-resolution images such as, for example, high definition TV to a large number of users. The standardization group (IUT-T and IEEE) related to PON is starting a study of the next-generation PON to be a successor to current PON systems.

Presently, 10GE-PON and WDM-PON are proposed in these standardization conferences as next-generation PON. As a multiplexing method for next-generation PON, time division multiple access (TDMA) is mainstream like the current PON, and application of code division multiple access (CDMA) is being studied as another multiplexing method. CDMA has the advantage that it has higher information transmission efficiency per transmission bandwidth than TDMA, because it enables concurrent transmission/reception of a plurality of flows with the same carrier, and adjustment of communication timing among ONTs and the securement of guard time between frames are unnecessary. Moreover, since CDMA can protect transmission data by spread spectrum with orthogonal spreading code, increasing the secrecy of information can be expected in PON systems that accommodate a large number of users on a single optical fiber.

Non-patent Document 1: ITU-T G.984.1 "Gigabit-capable Passive Optical Networks (GPON): General characteristics"

Non-patent Document 2: ITU-T G.984.2 "Gigabit-capable Passive Optical Networks (GPON): Physical Media Dependent (PMD) layer specification"

Non-patent Document 3: ITU-T G.984.3 "Gigabit-capable Passive Optical Networks (GPON): Transmission convergence layer specification"

Non-patent Document 4: IEEE 802.3ah "CSMA/CD Access Method and Physical Layer Specification Amendment: Media Access Control Parameters, Physical Layers, and Management Parameters for Subscriber Access Networks"

DISCLOSURE OF THE INVENTION

Problem to be Solved by the Invention

In optical CDMA, when CDMA signals are transmitted from a plurality of communication apparatuses to the same optical fiber by using carriers (laser beams) of the same wavelength, mutual interference occurs among transmission signals. If two optical transmission signals exist on the optical fiber in a wholly reverse phase with each other, the optical signals are cancelled out by mutual interference and signal strength becomes zero, with the result that transmission information is wholly lost (homodyne interference). Even when carriers different in wavelength are used, mutual interference occurs between transmission signals in the case where the wavelength difference between the carriers is insufficient. This mutual interference is called beat noise (heterodyne interference).

The homodyne interference and the heterodyne interference occur also in CDMA mobile wireless communication. However, in the case of mobile wireless communication, because the positional relationship between a base station and mobile terminals varies with time, even if the above-described mutual interference occurs between transmission signals, the influence is momentary and trivial in comparison with the influence of noise level and multipath.

However, in an optical access network such as PON, since the positional relationship between an OLT and an ONT is fixed and a transmitting apparatus transmits a signal with a stable laser beam, the influence may last for a long period of time if the above-described interference occurs on the optical fiber.

An object of the present invention is to provide an optical communication system capable of avoiding mutual interference of transmission signals on the optical fiber and enabling transmission of highly multiplexed signals.

Another object of the present invention is to provide an optical communication system of PON configuration that enables transmission of highly multiplexed signals by using code division multiplexing.

Means for Solving the Problem

In order to achieve the above-described objects, an optical communication system of the present invention is characterized in that CDMA signals are multiplexed on an optical fiber by WDMA. In the optical communication system of the present invention, a different carrier wavelength (laser wavelength) is used for each optical transmitter in order to suppress signal deterioration due to interference of laser beams. Further, allocation of carrier wavelength to each optical transmitter is performed within an optical frequency band (wavelength range) receivable by a single optical receiving device, and the interval between adjacent carrier wavelengths is made larger than the frequency bandwidth of a CDMA signal receivable by the optical receiving device so that interference components are prevented from being detected at a receiving side.

More specifically, an optical communication system of the present invention comprises a transmitting apparatus and a receiving apparatus connected to each other by an optical fiber. The transmitting apparatus comprises a plurality of code-division spreaders different in spreading code, a reception processing unit that selectively distributes transmission data to the plurality of code-division spreaders, a plurality of optical transmitters each of which transmits a code-spread signal to the optical fiber as a CDMA optical signal of a carrier wavelength different from that of the other optical transmitters, and a signal multiplexing unit that selectively supplies outputs of the plurality of code-division spreaders to the plurality of optical transmitters. The receiving apparatus comprises an optical receiver that receives a wavelength-division-multiplexed CDMA optical signal from the optical fiber, and a plurality of despreaders connected to the optical receiver and different in their spreading codes, wherein each of despreaders reproduces a CDMA signal corresponding to its spreading code from an output signal of the optical receiver.

An optical communication system of PON configuration according to the present invention comprises an office side apparatus (OLT) connected to a trunk optical fiber, and a plurality of subscriber connecting apparatuses (ONT) connected to branched optical fibers diverged from the trunk optical fiber. Each of the ONTs comprises a plurality of code-division spreaders different in their spreading codes, a reception processing unit that selectively distributes transmission data to the plurality of code-division spreaders, at least one optical transmitter that transmits a code-spread signal to the branched optical fiber as an optical signal of a carrier wavelength different from that of the other optical transmitters, and a signal multiplexing unit that selectively supplies outputs of the plurality of code-division spreaders to the optical transmitter. The OLT comprises an optical receiver that receives a wavelength-division-multiplexed CDMA signal from the trunk optical fiber, and a plurality of despreaders connected to the optical receiver and different in their spreading codes, wherein each of the despreaders reproduces a CDMA signal corresponding to its spreading code from an output signal of the optical receiver.

In the case of the optical communication system of PON configuration, each of the ONTs converts transmission data into a CDMA signal by the code-division spreader having a spreading code allocated from the OLT, and converts the CDMA signal into an optical signal by the optical transmitter having a carrier wavelength allocated from the OLT.

In an embodiment of the present invention, each of the ONTs includes a plurality of optical transmitters different in their carrier wavelengths. However, only a part of the plurality of optical transmitters may be made effective so that the rest are standby optical transmitters. In this case, the signal multiplexing unit selectively supplies outputs of the plurality of code-division spreaders to at least one optical transmitter in the effective state. A laser element adjustable in its oscillation wavelength can be applied to each optical transmitter. In this case, each of the ONTs controls the wavelength of each laser element so that each of the optical transmitters in the effective state has a carrier wavelength allocated in advance.

In an embodiment of the present invention, each of the ONTs has a wavelength allocation table indicating the correspondence between spreading codes and carrier wavelengths, and the signal multiplexing unit correlates the code-division spreaders and optical transmitters according to the wavelength allocation table. Further, each of the ONTs has a flow identifier table indicating the correspondence between flow identifiers of transmission data and spreading codes, and the reception processing unit correlates the transmission data and the code-division spreader according to the flow identification table.

Effect of the Invention

According to the present invention, by using the principle of WDM in combination with optical CDMA, the interference of lightwaves (influence of beat noise) impeding the practical use of optical CDMA can be avoided. Moreover, each ONT can transmit data in any access timing by applying CDMA and effectively using transmission capacity of optical fiber, without needing synchronization between ONTs unlike conventional PON systems.

BEST MODE FOR CARRYING OUT THE PREFERRED EMBODIMENTS

FIG. 1 shows the construction of a PON system to which optical CDMA of the present invention is applied, and carrier wavelengths (carrier frequencies) in optical fiber sections.

The PON system comprises an office side apparatus OLT (Optical Line Terminal) 1 and a plurality of subscriber connecting apparatuses ONT (Optical Network Terminal) 2 (2-1 to 2-$k$) connected to the OLT 1 through an optical fiber network. The optical fiber network comprises trunk optical fibers 700 (700-1 to 700-$m$) connected to the OLT 1, and a plurality of branched fibers 710 (710-1 to 710-$k$) connected to the trunk optical fiber 700 by optical splitters (optical couplers) 800 (800-1 to 800-$m$). Each ONT 2 is connected to a branched fiber 710, and a plurality of ONTs share the same trunk optical fiber 700 to communication with the OLT 1.

To each ONT 2, one or a plurality of user terminals 500 (500-2, 500-1A to 500-1N, and 500-$k$) are connected. The user terminals 500 can be connected to the ONT in various forms. For example, a terminal 500-2 is connected to the ONT through an individual subscriber line. There is a case of connecting to the ONT through a home switch or home router 300, like terminals 500-1A to 500-1N, or a case of connecting through a home network (LAN) 400, like a terminal 500-$k$. In the following description, a PC or a server to be arranged in an enterprise site for use in business as well as a personal PC to be used in an individual home will be referred to as the user terminal 500.

Each ONT 2, for example, as shown in ONT 2-$k$, comprises a switch 21 accommodating connection lines for user terminals, an optical interface 22 connected to a branched fiber 710, an ONT upward interface board (hereinafter referred to as ONT-UIF) 20U and an ONT downward interface board (hereinafter referred to as ONT-DIF) 20D that are connected between the switch 21 and the optical interface 22. The ONT-UIF 20U is an interface board for handling upward data transmitted from user terminals and to be forwarded toward a wide area network via the OLT 1. The ONT-DIF 20D is an interface board for handling downward data forwarded from a wide area network toward user terminals via the OLT 1.

The OLT 1 comprises a plurality of PON interface boards (hereinafter referred to as PON-IFB) 10 (10-1 to 10-m) each accommodating the trunk optical fiber 700 (700-1 to 700-m), and a switch (or router) 12 connected to the PON-IFBs.

The PON-IFB 10 includes an optical interface 11 connected to the trunk optical fiber 700, an OLT upward interface board (hereinafter referred to as OLT-UIF) 10U and an OLT downward interface board (hereinafter referred to as OLT-DIF) 10D, each of which is connected between the optical interface 11 and the switch 12.

To the switch 12 (or router), an access network (local IP network) toward an ISP (Internet Service Provider) network and a wide area network is connected. However, the switch may accommodate a relay network connected to a specific site such as enterprise. It is assumed here that the switch 12 is composed of a layer 2 switch. In this case, the function of the switch 12 differs depending on the standard of the PON system and the type of data to be transmitted. For example, in the case where an upward received frame is an Ethernet frame as in the PON system of Non-patent Document 4, the switch 12 performs header information processing on the received frame, and control of forwarding the received frame to an outgoing route. In the case where an upward received frame is a TDM (Time Division Multiplexing) frame as G-PON described in Non-patent Documents 1 to 3, the switch 12 performs encapsulation processing to convert the received frame into an Ethernet frame, and processing for forwarding the received frame to an outgoing route.

At the place of switch 12, it is possible to introduce the processing of layer 3 protocol of the OSI, and further processing of higher-level layers including IGMP (Internet Group Management Protocol) proxy and MLD (Multicast Listener Discovery) proxy that are associated with firmware. As the present invention relates to signal multiplexing on the optical fiber connecting the ONTs and the OLT, however, detailed descriptions on the functions of the SW 12 are omitted. In the following embodiments, it is assumed that Ethernet (registered trademark) is applied, for example, as protocols from physical layer to transport layer of the subscriber line side UNI (User Network Interface) of the ONT 2.

In FIG. 1, CDMA upward signals are transmitted from the ONT 2-1 to the branched optical fiber 710-1 by carriers of wavelengths λ (n1-s) to λ (n1-e), CDMA upward signals are transmitted from the ONT 2-2 to the branched optical fiber 710-2 by carriers of wavelengths λ (n2-s) to λ (n2-e), and CDMA upward signals are transmitted from the ONT 2-k to the branched optical fiber 710-k by carriers of wavelengths λ (nk-s) to λ (nk-e). These carriers are wavelength-multiplexed on the trunk fiber 700 and arrive at the OLT 1. On the other hand, CDMA downward signals are transmitted by carriers of λ (n1-s) to λ (nk-e) from the OLT 1. These downward signals are broadcast from the trunk fiber 700 to each branched optical fiber 710.

Here, the wavelengths λ (n1-s) to λ (n1-e), λ (n2-s) to λ (n2-e), and λ (nk-s) to λ (nk-e) are merely schematically shown to indicate that a different carrier wavelength is applied for a different branched fiber. Each ONT 2 uses carrier wavelengths and spreading codes specified from the OLT 1 to transmit upward data. The number of wavelengths (or carrier frequencies) to be used by each ONT 2 may be plural in some cases, but may be one in other cases.

FIG. 2 shows a construction example of the upward interface board (ONT-UIF) 20U in the ONT 2 (2-1 to 2-k).

The ONT-UIF 20U includes a code spreading unit 210, a multiplexing unit 220, an optical transmitting unit 230, and a control unit 250. The control unit 250 is provided with a flow ID table 251 indicating, as shown in FIG. 4(A), the correspondence between a flow identifier (flow ID) 2511 and a spreading code number (code-division spreader ID) 2512, and a wavelength allocation table 252 indicating, as shown in FIG. 4(B), the correspondence between a spreading code number (code-division spreader ID) 2521 and a carrier length (optical transmitter ID) 2522. In order to save memory capacity, however, the flow ID table 251 and the wavelength allocation table 252 may be unified so that the correspondence of the flow identifier 2511 to the spreading code number 2512 (2521) and carrier wavelength 2522 is indicated by a single table.

The optical transmitting unit 230 includes a plurality of optical transmitters 231 (231-1 to 231-y) different in carrier wavelength (laser wavelength) identified by the optical transmitter ID 2522. In the following embodiments, when the number 2521 of spreading code to be applied to a transmission frame is identified by the flow ID table 251, the carrier wavelength of the transmission frame is determined by the wavelength allocation table 252, and an optical transmitter for converting a CDMA spread signal into an optical signal is identified.

The code spreading unit 210 includes a reception processing unit 211 connected to the SW 21, and a plurality of code-division spreaders 212 (212-1 to 212-x) connected to the reception processing unit 211. Upon receiving an Ethernet frame transmitted from each terminal through the SW 21, the reception processing unit 211 extracts a VLAN-ID (hereinafter referred to as VID) from the header of the received frame, searches the flow ID table 251 for a spreading code number j corresponding to the VID, and distributes the received frame to a code-division spreader 212-j corresponding to the spreading code number j. The VID may be a value such as the user ID of the source of the received frame, the service ID to which the frame belongs, etc.

The code-division spreader 212-j converts the received frame into a high-speed spread spectrum signal having a chip rate of spreading code by spreading the received frame (Ethernet frame) having a symbol rate with the spreading code, and outputs it to the multiplexing unit 220. The multiplexing unit 220 selectively supplies each of the spread signals outputted from the code-division spreaders 212-1 to 212-x to any one of the optical transmitters 231-1 to 231-y according to the wavelength allocation table 252. However, when the number of effective state optical transmitters in the optical transmitting unit 230 is one, all spread signals outputted from the code-division spreaders 212-1 to 212-x are transmitted by one carrier.

In the case where the optical transmitting unit 230 is provided with a plurality of optical transmitters 231-1 to 231-y, lasers having different oscillation frequencies are used for the optical transmitters. When a plurality of spread signals are multiplexed on a specific carrier, the plurality of spread signals may be linearly added and converted into a multilevel rectangular wave before being supplied to the optical transmitters. In this case, the code-division spreaders are clock-synchronized with each other so that the linearly added signals can be correctly transmitted.

In FIG. 1, carriers of different range are allocated to each ONT so that the ONT 2-1 performs wavelength division multiplexing of CDMA spread signals in the range of carrier wavelengths λ(n1-s) to λ(n1-e), the ONT 2-2 in the range of carrier wavelengths λ(n2-s) to λ(n2-e), and the ONT 2-k in the range of carrier wavelengths λ(nk-s) to λ(nk-e). As for spreading code, codes of different range are allocated to each ONT.

FIG. 3 shows a construction example of OLT-UIF 10U.

The OLT-UIF 10U comprises an optical receiver (O/E (Optical to Electric) converter) 110, despreading unit 120, and transmission processing unit 130. CDMA spread signals wavelength-division-multiplexed on the trunk optical fiber 700 are inputted to the optical receiver 110 through the optical interface 11. The optical receiver 110 converts a received optical signal into an electric signal, and outputs a multilevel rectangular wave signal to the despreading unit 120. The multilevel rectangular wave signal is generated by linearly adding all spread signals contained in the received optical signal. Here, the optical receiver 110 is composed of an optical receiving device capable of converting CDMA optical signals into an electric signal within the range of carrier frequencies $\lambda(n1\text{-}s)$ to $\lambda(nk\text{-}e)$.

The despreading unit 120 comprises a plurality of despreaders 121 (121-1 to 121-*x*) different in the spreading code to be applied. Each of the despreaders 121 performs despread processing on the multilevel rectangular wave outputted from the optical receiver 110, by using a spreading code (Code 1, Code 2, . . . Code x) peculiar thereto. Here, the despreading refers to detecting the correlation between the received signals and the spreading code. For example, the despreader 121-1 comprises a matched filter between the received signals and code "Code 1" that exhibits high correlation as to a signal component having been spread with "Code 1" at a transmission side, but further weakens the signal strength by dispreading as to signal components having been spread with the other codes. Therefore, by integrating the output of the matched filter throughout a code period of chip rate, data of symbol rate having been spread with "Code 1" at the transmission side can be reproduced.

The transmission processing unit 130 performs header processing on each received frame outputted at the symbol rate from the despreading unit 120 as required, and forwards it to the switch 12. In this case, the header processing includes, for example, attaching a VLAN tag or MPLS label to the header, header conversion, partial deletion of header information, and the like.

FIG. 5 shows spread signals inputted to the multiplexing unit 220 of the ONT-UIF 20U (FIGS. 5(A) and 5(B)), and a multilevel rectangular wave generated by performing linear addition processing on them (FIG. 5(C)).

FIGS. 5(A) and 5(B) show chip rate signals S1 and S2 having been spread with different spread signals, respectively. When the signals S1 and S2 are linearly added in the state in which clock timings of two code-division spreaders for outputting the signals S1 and S2 are synchronized with each other, a multilevel rectangular wave signal S3 is obtained as shown in FIG. 5(C). In the case of transmitting the signals S1 and S2 with the same carrier, they are supplied to the optical transmitter after converting into the signal S3, and converted into an optical signal of predetermined carrier wavelength by using the linearity of laser output signal strength.

The optical receiver 110 of OLT-UIF 10U converts CDMA optical signals wavelength-division-multiplexed with a plurality of carriers into an electric signal. At this time, by converting optical signals on a plurality of carriers into an electric signal at the same time in clock synchronization with the optical signals transmitted at the chip rate, the output signal waveform of the optical receiving device becomes a multilevel rectangular wave like FIG. (C). By multiplying the multilevel signal by spreading codes Code 1 to Code x by the despreaders 121-1 to 121-*x*, symbol rate data corresponding to the spreading codes can be restored.

In the present embodiment, usable carrier wavelengths and spreading codes are allocated in a different range to each ONT, according to the flow ID table 251 and the wavelength allocation table 252. However, the correspondence between carrier wavelengths and spreading codes are free among the ONTs. All spreading codes (spread signals) may be associated with different carriers, and a plurality of spreading codes may be associated with an identical carrier.

By applying a different spreading code to each ONT, a plurality of carriers can be formed logically in an optical fiber section so that flow identification is made possible at a reception (OLT) side. Moreover, by transmitting spread signals with carrier wavelengths different for each ONT, physical signal interference can be suppressed in an optical fiber section.

FIG. 6 shows the allocation of carrier wavelengths (carrier frequencies) to ONTs and flow IDs.

In the present embodiment, a plurality of carriers (laser beams) 501-1 to 501-N having their peaks at mutually different frequencies 511-1 to 511-N, respectively, are defined in an optical bandwidth 500 receivable by the optical receiver 110 provided in the OLT-UIF 10U. Control of laser frequencies (wavelengths) will be detailed later. The frequencies 511-1 to 511-N are arranged at a fixed frequency interval $\Delta f$.

The frequency interval $\Delta f$ of mutually adjacent laser beams is determined to be a sufficient value so that the laser beams cause no interference on the branched optical fibers and the trunk optical fiber and interference components (beat noises) are not detected by the receivers. Specifically, the frequency interval $\Delta f$ may be equal to or greater than the bandwidth of CDMA spread signals that can be received by the optical receiver 110. For example, in the transmission of an CDMA optical signal whose chip rate is 10 Gbps, a frequency interval of 10 GHz or more may be secured between lasers having adjacent wavelengths.

In the lower portion of FIG. 6, the relationships between carriers (laser frequencies) and spreading codes allocated to ONTs are shown. Here, frequencies 511-1 and 511-2 (laser beams 501-1 and 501-2) serving as carriers are allocated to ONT#1, a frequency 511-3 (laser beam 501-3) is allocated to ONT#2, and a plurality of frequencies (laser beams 501-4, . . . ) beginning with a frequency 511-4 are allocated to ONT#3. Further, spreading Codes #1 and #3 to be used by ONT#1 are allocated to the frequency 511-1, and spreading Code #2 to the frequency 511-2. Spreading Codes #5 to #7 to be used by ONT #2 are allocated to the single frequency 511-3. In each ONT, the correspondence between spreading codes and frequencies is stored in the wavelength allocation table 252 shown in FIG. 4.

FIG. 7 shows a construction example of the OLT downward interface board (OLT-DIF) 10D.

The OLT-DIF 10D comprises a control unit 150, code spreading unit 160, multiplexing unit 170, and optical transmitting unit 180.

The control unit 150 is provided with a flow ID table 151 and a wavelength allocation table 152. The flow ID table 151 indicates, for example, as shown in FIG. 9, the correspondence among a flow identifier (flow ID) 1511, a spreading code number (code-division spreader ID) 1512, and an ONT identifier (ONT-ID) 1513. The wavelength allocation table 152 indicates, like the ONT wavelength allocation table 252 shown in (B) of FIG. 4, the correspondence between the spreading code number (code-division spreader ID) and the carrier wavelength (optical transmitter ID). As described in the ONT-UIF 20U, the flow ID table 151 and the wavelength allocation table 152 may be unified into one table.

The optical transmitting unit 180 includes a plurality of optical transmitters (laser elements) 181 (181-1 to 181-*y*) different in oscillation frequency (laser wavelength $\lambda$). The wavelength of each optical transmitter is determined so as to secure a sufficient wavelength interval between adjacent wavelengths so that a plurality of laser beams do not interfere with each other on the optical fiber.

The code spreading unit 160 comprises a reception processing unit 161 connected to the switch 12, and a plurality of code-division spreaders 162 (162-1 to 162-j) connected to the reception processing unit 161. Upon receiving a frame from the switch 12, the reception processing unit 161 adds a header including an ONT identifier to the received frame by referring to the flow ID table 151, and after that, distributes the received frame to a proper code-division spreader.

Specifically, the reception processing unit 161 extracts a data flow identifier (flow ID) such as the user ID of a transmitting source or service ID and the like, from the header of the received frame, and searches the flow ID table 151 for a spreading code number i and ONT identifier that correspond to the flow ID. After converting the received frame into a PON frame having the ONT identifier, the reception processing unit 161 forwards it to a code-division spreader 162-i identified by the spreading code number i. However, the conversion of the received frame into a PON frame may be performed, for example, by referring to a specific route table indicating the correspondence between header information of the received frame and the identifier of ONT to be the forwarding destination of the received frame.

The code-division spreader 162-i converts the received frame into a wide-band spectrum spread signal by spreading each symbol of the received frame with a spreading code having a rate (chip rate) faster than the symbol rate of the received frame. The spread signal outputted from the code-division spreader 162-i is forwarded to the multiplexing unit 170. The multiplexing unit 170 distributes the spread signal supplied from the code-division spreader 162-i to an optical transmitter 181-i corresponding to the spreading code number i.

Specifically, the multiplexing unit 170 specifies a carrier frequency (wavelength λ) corresponding to the spreading code number i by referring to the wavelength allocation table 152, and supplies the spread signal to an optical transmitter (laser element) 181-k which oscillates at the specified frequency. In the case where the wavelength allocation table 152 correlates a plurality of spreading codes with one carrier frequency, the multiplexing unit 170 linearly adds outputs from a plurality of code-division spreaders to be superimposed on the same carrier, and supplies a spread signal converted into a multilevel rectangular wave to the optical transmitter having the specified carrier frequency.

In the case where a control message is transmitted from the control unit 150 of the OLT 1 to the ONT 2 (2-1 to 2-k), the control message is code-spread by a specific code-division spreader, for example, a code-division spreader 162-j, and supplied to a specific optical transmitter through the multiplexing unit 170.

By the above-described construction, CDMA signals wavelength-division-multiplexed with carriers of wavelengths λ(n1-s) to λ(nk-e) are transmitted from the PON-IFB 10-1 of OLT 1 to the trunk optical fiber 700-1. These CDMA signals are diverged to the branched fibers 710-1 to 710-k by the optical splitter 800-1, and arrive at all ONTs 2-1 to 2-k.

FIG. 8 shows the construction of the ONT downward interface board (ONT-DIF) 20D.

The ONT-DIF 20D includes an optical receiver 260, a despreading unit 270, and a transmission processing unit 280. The despreading unit 270 includes a plurality of despreaders 271-1 to 271-j each of which despreads a received signal with a spreading code different from each other. In each ONT, however, among the plurality of despreaders 271-1 to 271-j, only a specific number of despreaders having specific spreading codes allocated in advance are made effective (active despreaders), and the other despreaders are standby despreaders.

The optical receiver 260 receives CDMA spread signals, which were transmitted from the OLT 1 by being wavelength division multiplexed, through the branched fiber 710 and the optical interface 22, and converts the spread signals into an electric signal of a multilevel rectangular wave by linearly adding all the spread signals. In the present embodiment, the optical receiver 260 is constructed by one optical receiving device (photodiode: DA).

The electric signal of the multilevel rectangular wave outputted from the optical receiver 260 is inputted in parallel to the plurality of despreaders 271-1 to 271-j in the despreading unit 270. To these despreaders, spreading codes Code 1 to Code j that were applied to the transmission data by the code spreading unit 160 of the OLT-DIF 10D are allocated. Each despreader multiplies the electric signal of the multilevel rectangular wave supplied from the optical receiver 260 by a specific spreading code, and outputs, as the symbol value of data flow corresponding to the spreading code, a binary decision result of an integral value during a time period corresponding to a symbol rate.

By using one of the despreaders 271-1 to 271-j, for example, a despreader 271-j having the same spreading code Code j as the code-division spreader 162-j, with which the OLT performs code spreading of control frames, for use in control frame reception and forwarding a received frame reproduced by the despreader 271-j to the control unit 250, control information can be distributed from the OLT 1 to the ONT 2.

The transmission processing unit 280 determines header information of PON frames each composed of a symbol sequence reproduced by each of the despreaders 271-1 to 271-j, and discards PON frames addressed to other stations. Upon receiving a PON frame addressed to its own station, the transmission processing unit 280 performs header processing, thereby to forward a control frame to the control unit 250 and a user frame to the switch 21. The frame header processing includes, for example, elimination of a PON header, and adding/conversion/deletion of a VLAN tag or MPLS label, and the like. The switch 21 forwards each frame received from the transmission processing unit 280 to any one of the subscriber lines, which include the switch connection line and LAN connection line, specified in accordance with the header information.

In order to allocate usable carrier wavelengths (laser wavelengths) and usable spreading codes from the OLT 1 to the ONT 2, the control unit 150 of OLT-DIF 10D stores carrier frequencies (laser wavelengths) and spreading codes having been allocated to each ONT. Each PON interface board 10 can allocate a plurality of carrier frequencies (laser wavelengths) to the same ONT and a plurality of spreading codes to the same ONT. In this case, same carrier frequency should be avoided from being duplicately allocated to a plurality of ONTs. This is similar to spreading codes; a spreading code having been already allocated to any ONT should be avoided from being allocated to other ONTs.

Carrier frequencies (laser wavelengths) and spreading codes having been allocated to each ONT are stored, for example, in a management table 153 in association with ONT identifiers. The management table 153 is useful to grasp the operational status of the system, not only in the case where carrier frequencies (laser wavelengths) and spreading codes are statically allocated to each ONT, but also in the case where carrier frequencies (laser wavelengths) and spreading codes are dynamically allocated when an ONT is started.

FIG. 10 shows another embodiment of ONT-UIF 20U.

In the present embodiment, carrier wavelengths of the optical transmitters 231 (231-1 to 231-y) are controlled by using the temperature dependency of laser beams. However, the oscillation frequencies of laser elements may be controlled by parameters other than the temperature.

The optical transmitters 231 of the present embodiment comprises a laser 232, a modulation circuit 233, a temperature controller 234 connected to the laser 232, and a control information register 235. The temperature controller 234 obtains a target temperature from the register 235, and automatically controls so that the laser operates at the target temperature, whereby the laser 232 generates an optical CDMA signal (modulation light of spread signal) at a predetermined wavelength (carrier frequency) determined by the target temperature. Output light from the laser 232 is transmitted to the branched fibers 710 through the optical interface 22.

Loading of control information to each register 235 is performed by the control unit 250. This configuration becomes effective when a laser wavelength (carrier frequency) usable in the optical transmitter 231 is designated from the OLT 1 to each ONT 2. The wavelength usable in the optical transmitter 231 is notified by a downward control message. If the wavelength is specified, a target temperature of the laser is uniquely determined.

The control unit 250 of each ONT stores the wavelengths designated from the OLT 1 in a wavelength management table 253 in association with the identifiers (ID) of the optical transmitters, and sets a target temperature determined by the wavelength to the register 235 of the optical transmitter.

FIG. 11 shows an example of the wavelength management table 253.

The wavelength management table 253 comprises a plurality of entries each storing an optical transmitter ID 2531, and a wavelength 2532 specified from the OLT 1. The value of frequency may be stored instead of the wavelength 2532. The control unit 250 can uniquely determine a target temperature of the laser if a wavelength is specified. Therefore, target temperature 2533 corresponding to the wavelength 2532 may be stored in each entry so that the control unit 250 sets the target temperature 2533 one after another to the control information register 235 of the optical transmitter indicated by the optical transmitter ID 2531.

FIG. 12 shows further another embodiment of ONT-UIF 20U.

In the present embodiment, an external resonance laser 236 using fiber grating (FG) 237 is applied to the optical transmitter 231. The external resonance laser 236 can cause the optical transmitter 231 to oscillate at a desired wavelength by adjusting the oscillation wavelength according to the position of the fiber grating 237. However, in the external resonance laser 236 using the fiber grating (FG) 237, if its oscillation frequency has been adjusted once to a desired value when the optical transmitter was assembled, it becomes difficult to change the wavelength dynamically by a control signal supplied from the outside at the time of starting the ONT like the temperature control type lasers.

Therefore, in the present embodiment, a plurality of optical transmitters 231-1 to 231-y different in their oscillation wavelength are provided in advance in the optical transmitter 230 so that optical transmitters each having wavelength allocated from the OLT 1 are made effective based on the wavelength allocation table 252 and multiplexing of code spread signals is performed.

FIG. 13 shows further another embodiment of ONT-UIF 20U to which the external resonance laser 236 is applied.

In the present embodiment, instead of dynamic carrier wavelength selection with reference to the wavelength allocation table 252, the multiplexing unit 220 connects fixedly between the code-division spreaders 212 and the optical transmitters 231 by adders 221 (221-1 to 221-w). Therefore, at the time when the reception processing unit 211 has allocated a spreading code to a received frame, a carrier frequency to which the spreading code should be superimposed is determined.

In the above-described embodiment, the reception processing unit 211 (161) of the code spreading unit extracts a VLAN identifier (VID) as a flow ID from the received frame, searches the flow ID table 251 (151) for a spreading code number corresponding to the flow ID, and determines a code-division spreader 212 (162) to process the received frame. However, the spreading code does not always need to be defined individually for each of the VIDs on the transmission side. For example, in the case where a plurality of VLANs are used by the same user, spreading codes may be allocated for each user. Conversely, in the case where a VLAN is allocated to each group comprising a plurality of users, for example, when a closed area network is constructed for each enterprise site, a spreading code applied to the received frame is conceivably used as a sub-parameter for flow identification to identify a user. Therefore, the correspondence between flow IDs and spreading code numbers varies depending on the configuration of networks and communication services.

Although optical CDMA is applied to a PON system in the above-described embodiments, the optical CDMA of the present invention is also applicable to communication systems other than PON.

For example, in an optical multiplexing transmission apparatus used in a core network or an optical switch used in an access network and a metro network, it is possible to transmit a plurality of spread signals in a wavelength-multiplexed form and to receive them by using a single optical receiving device at the receiving side, like the above-described ONT and OLT.

FIG. 14 shows the construction of a general optical signal multiplexing apparatus to which the optical CDMA of the present invention is applied.

The basic construction of a transmission interface 200A and a reception interface 200B provided in each of communication apparatuses 3A and 3B connected through an optical fiber 750 is the same as that of ONT-UIF 20U and OLT-UIF 10U of the PON shown in FIG. 1. In the case of a general optical signal multiplexing apparatus, in which there is no branch on the optical fiber between the communication apparatuses, different from the case of a PON, it is sufficient for a spreading code on a carrier wavelength to secure orthogonality for each optical fiber (route).

The present invention is also applicable to an optical communication apparatus, such as a wholly-optical switch that is currently being developed with the miniaturizing of laser oscillation devices, in addition to a PON as an existing optical communication system and an optical multiplexing transmission apparatus in core networks. Moreover, by combining with TDM, it is possible to further increase the number of users to be multiplexed on the same optical fiber.

A figure showing the construction of a PON system to which the present invention is applied, and carrier frequencies in the optical fiber section.

FIG. 2

Figure 1:
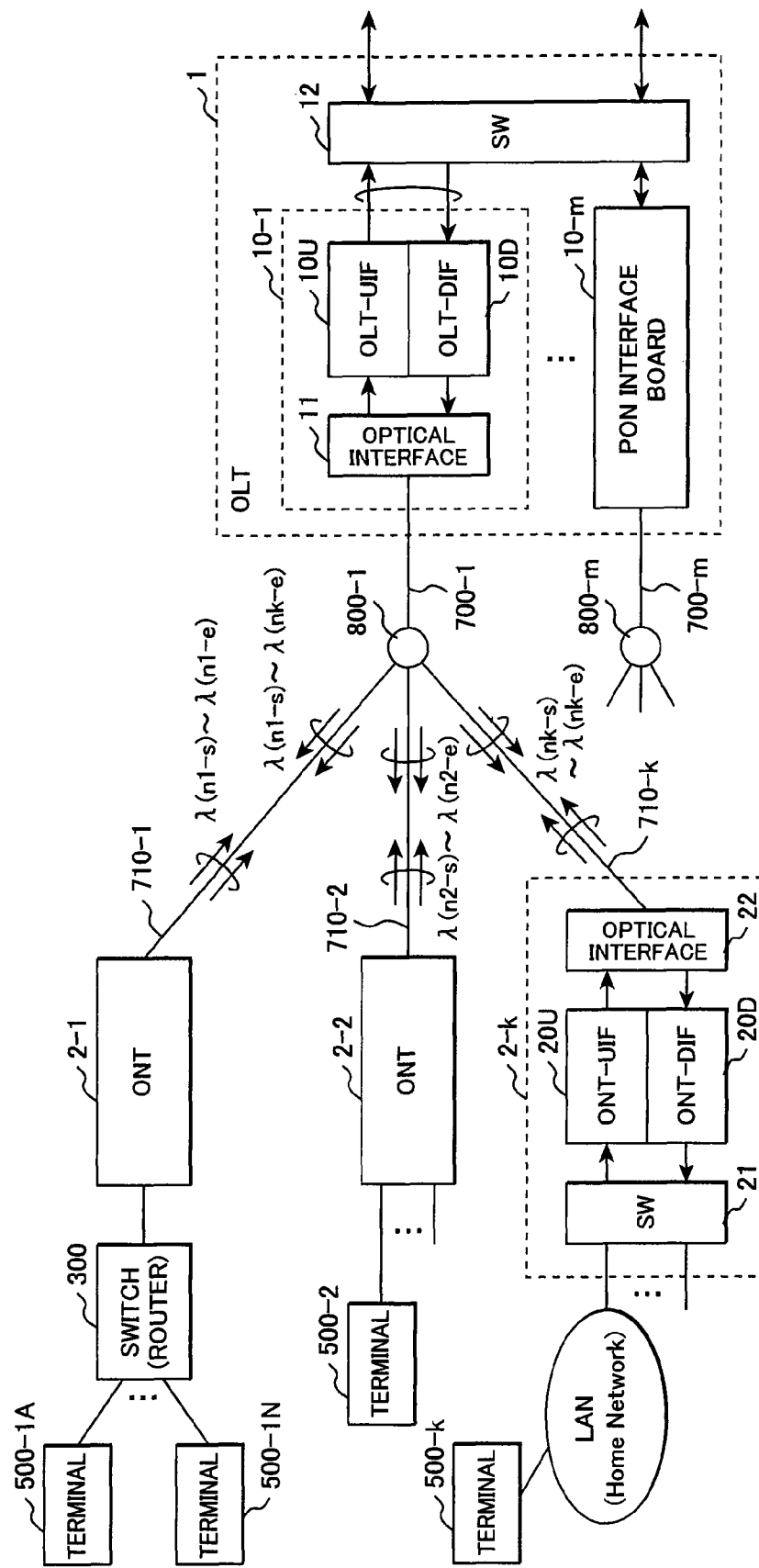
FIG. 1
Figure 2:
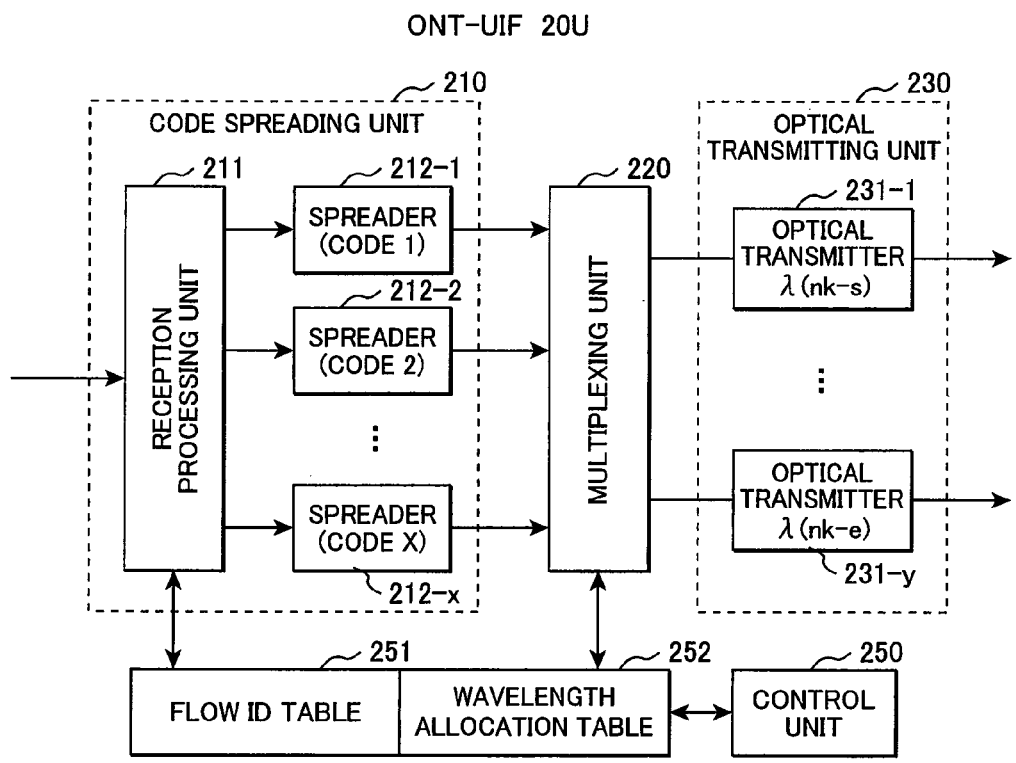
Figure 3:
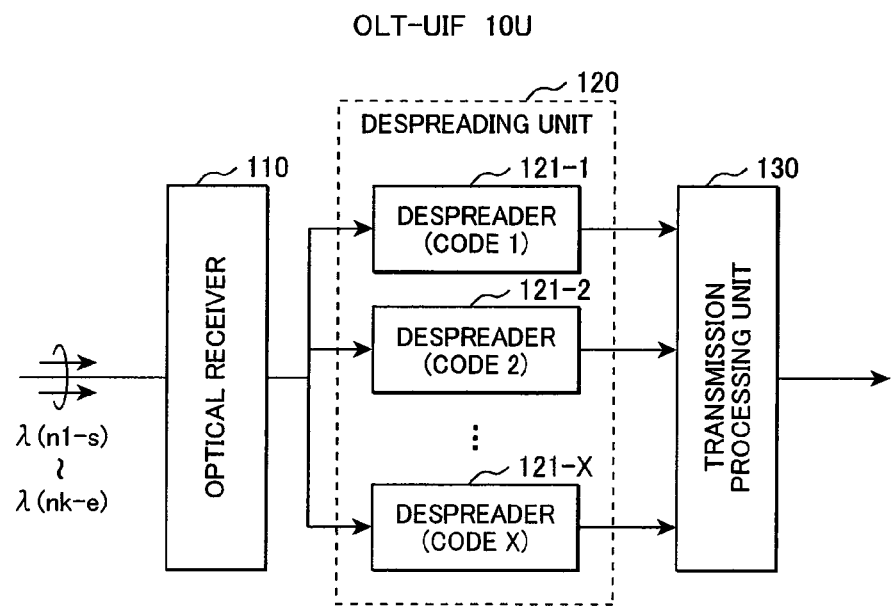
Figure 5:
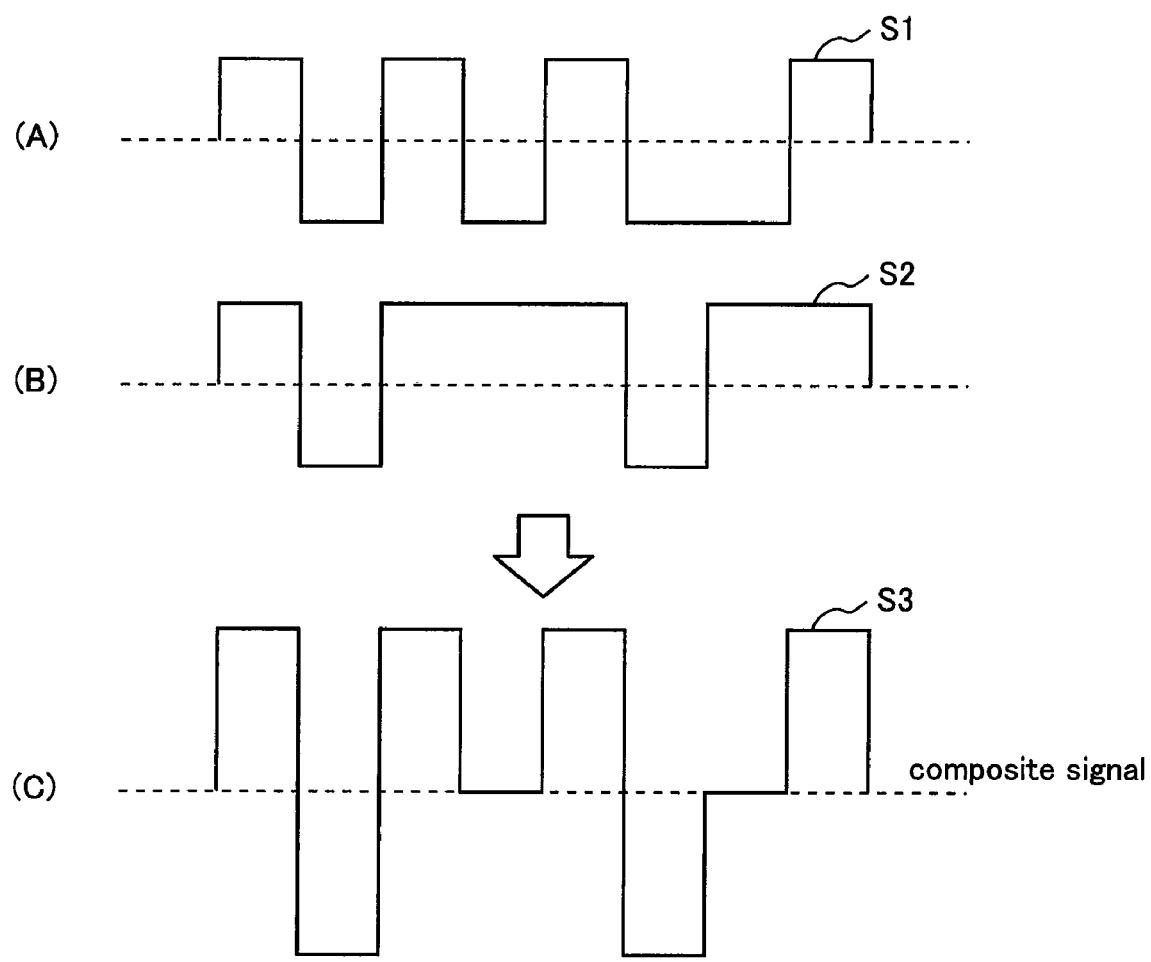
Figure 6:
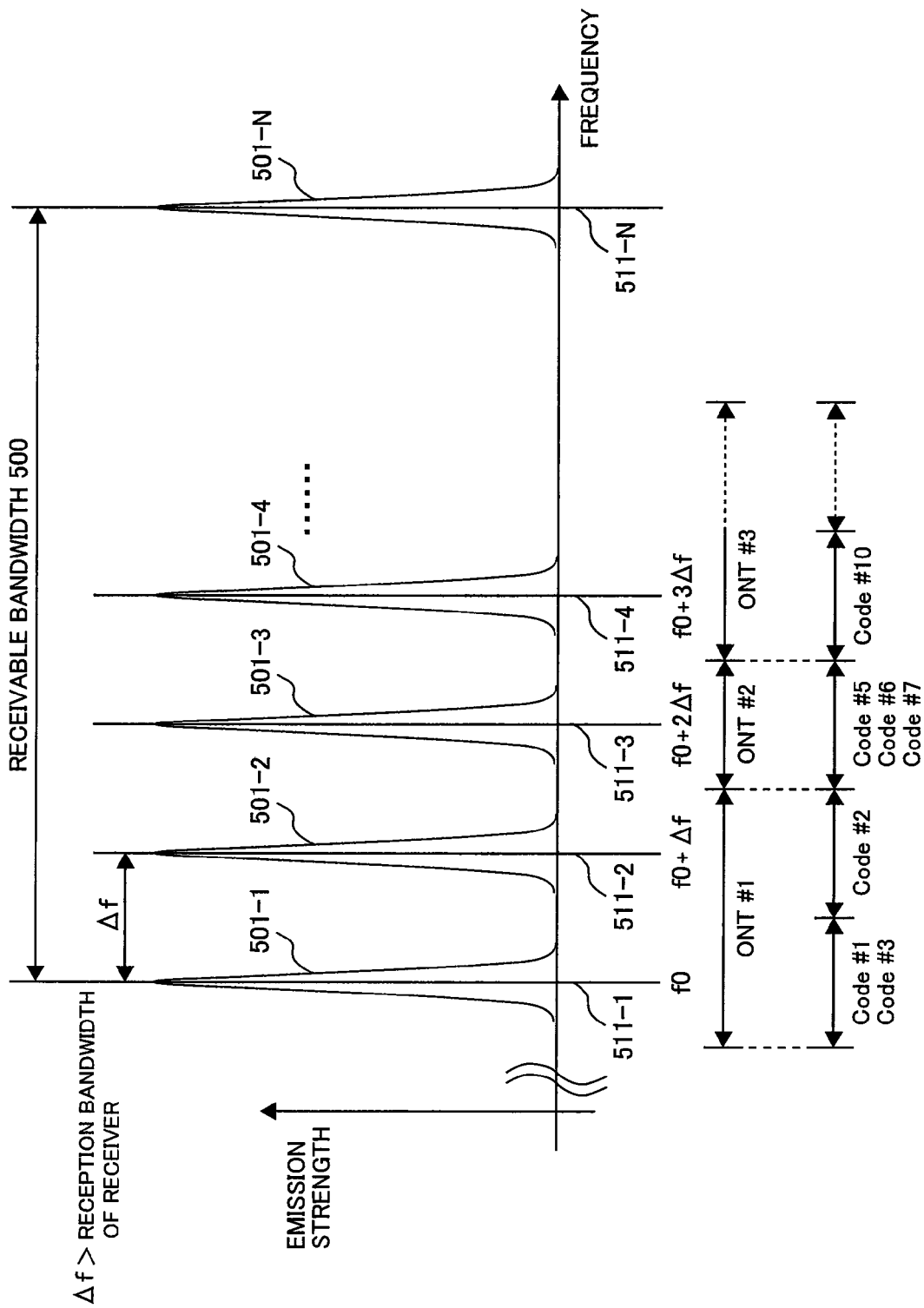
Figure 7:
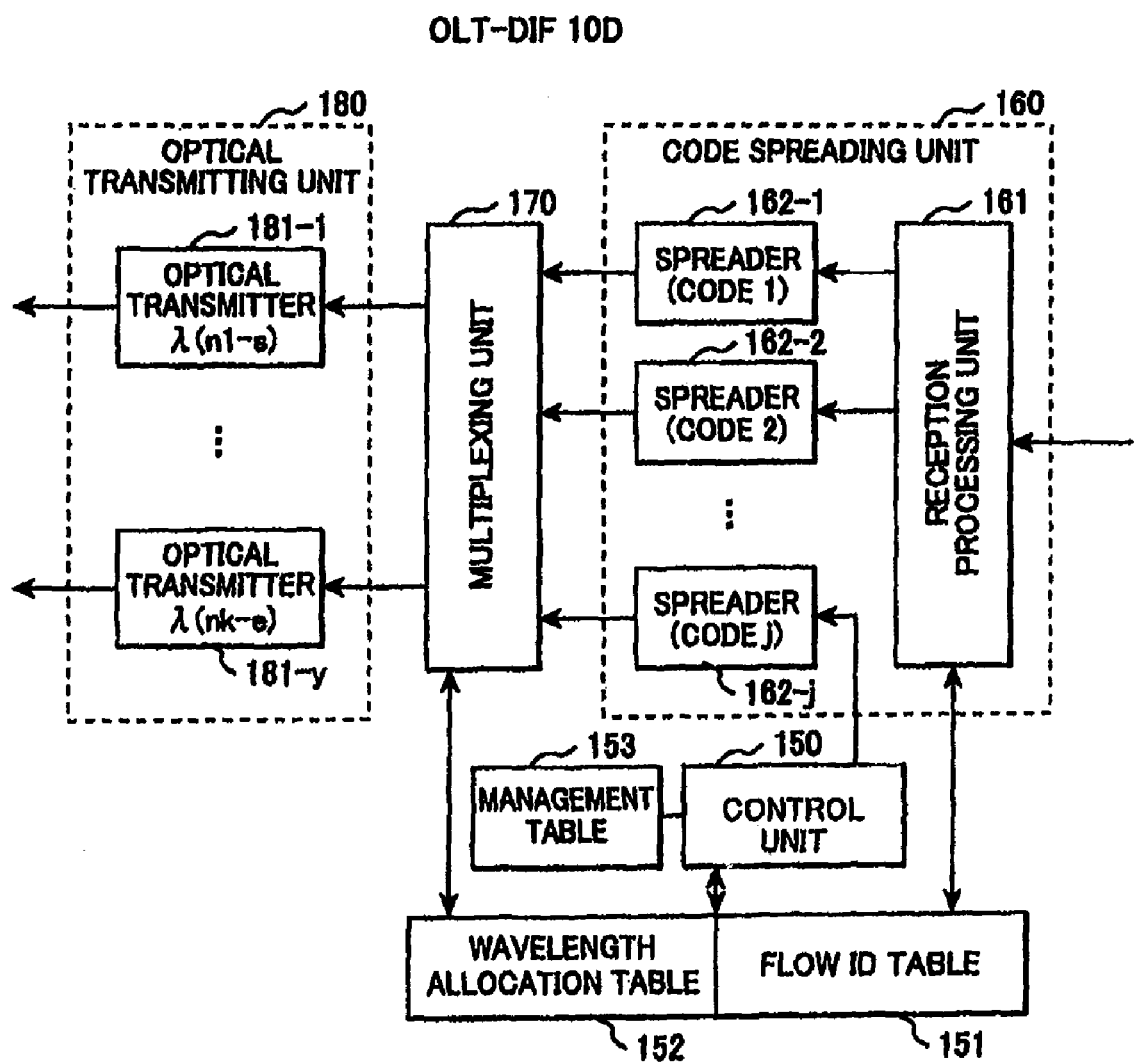
Figures 8, 9:
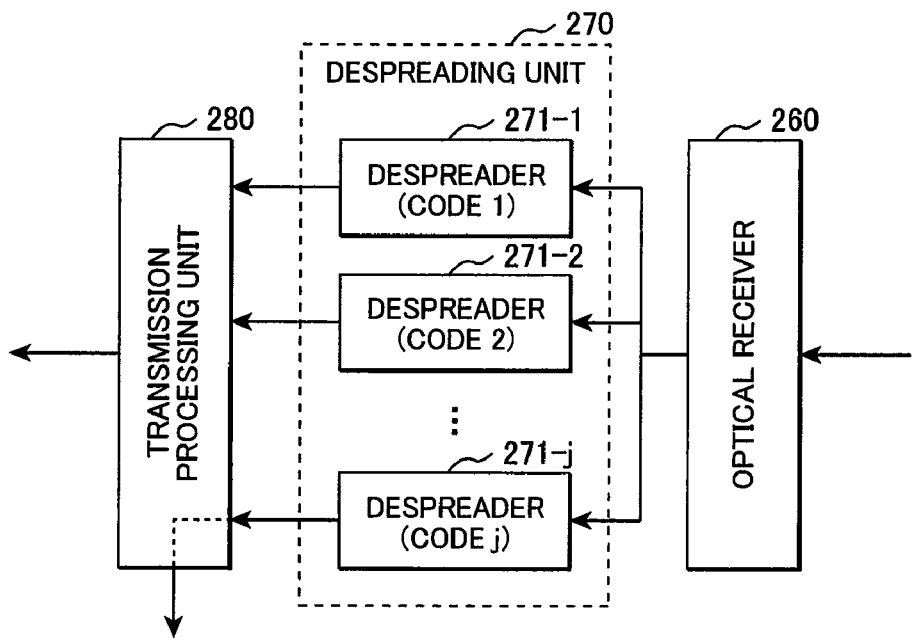

A figure showing a construction example of an upward interface board (ONT-UIF) 20U provided in the ONT 2 of FIG. 1.

FIG. 3

A figure showing a construction example of an upward interface board (ONT-UIF) 10U provided in the ONT 1 of FIG. 1.

FIG. 4

Figures showing a flow ID table 251 (FIG. (A)) and wavelength allocation table 252 (FIG. (B)) provided in a control unit 250 of ONT-UIF 20U.

FIG. 5

Figures showing spread signals to be inputted to a multiplexing unit 220 of ONT-UIF 20U (FIGS. (A) and (B)) and a multilevel rectangular wave generated by linear addition processing of the spread signals (FIG. (C)).

FIG. 6

A figure showing allocation of carrier frequencies to ONTs and flow IDs.

FIG. 7

A figure showing a construction example of a downward interface board (OLT-DIF) 10D provided in the OLT 1.

FIG. 8

A figure showing a construction example of a downward interface board (ONT-DIF) 20D provided in the ONT 2.

FIG. 9

A figure showing the contents of a flow ID table 151 provided in a control unit 150 of OLT-DIF 10D

FIG. 10

A figure showing another embodiment of ONT-UIF 20U.

FIG. 11

Figures 10, 11:
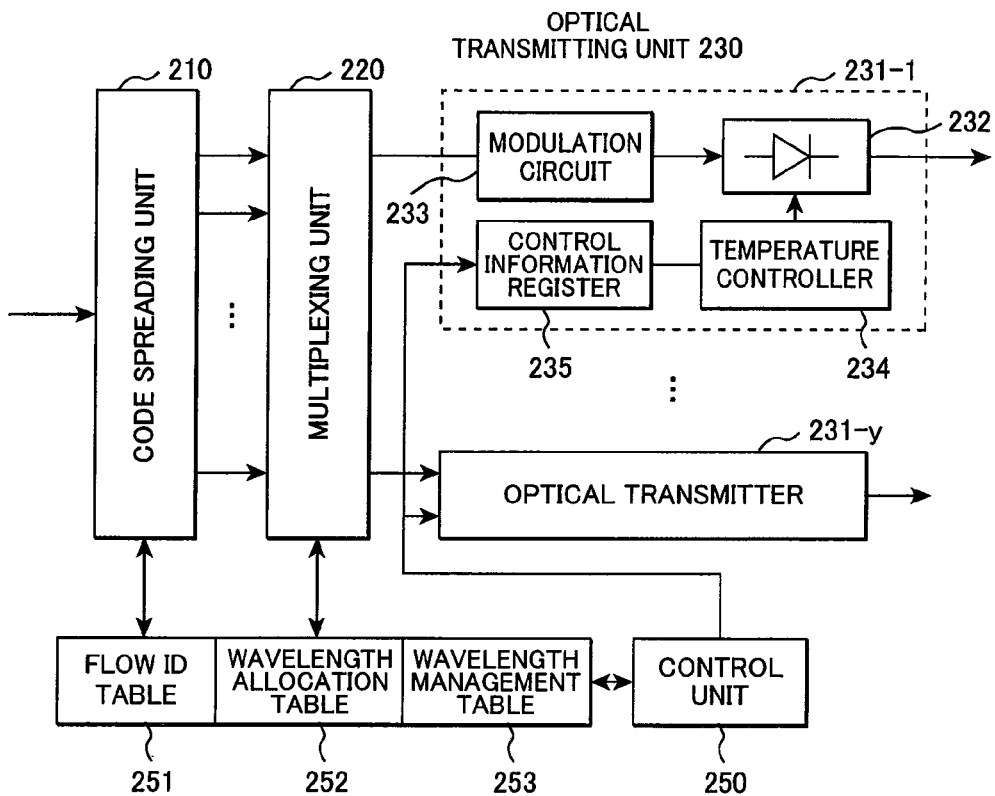
Figure 12:
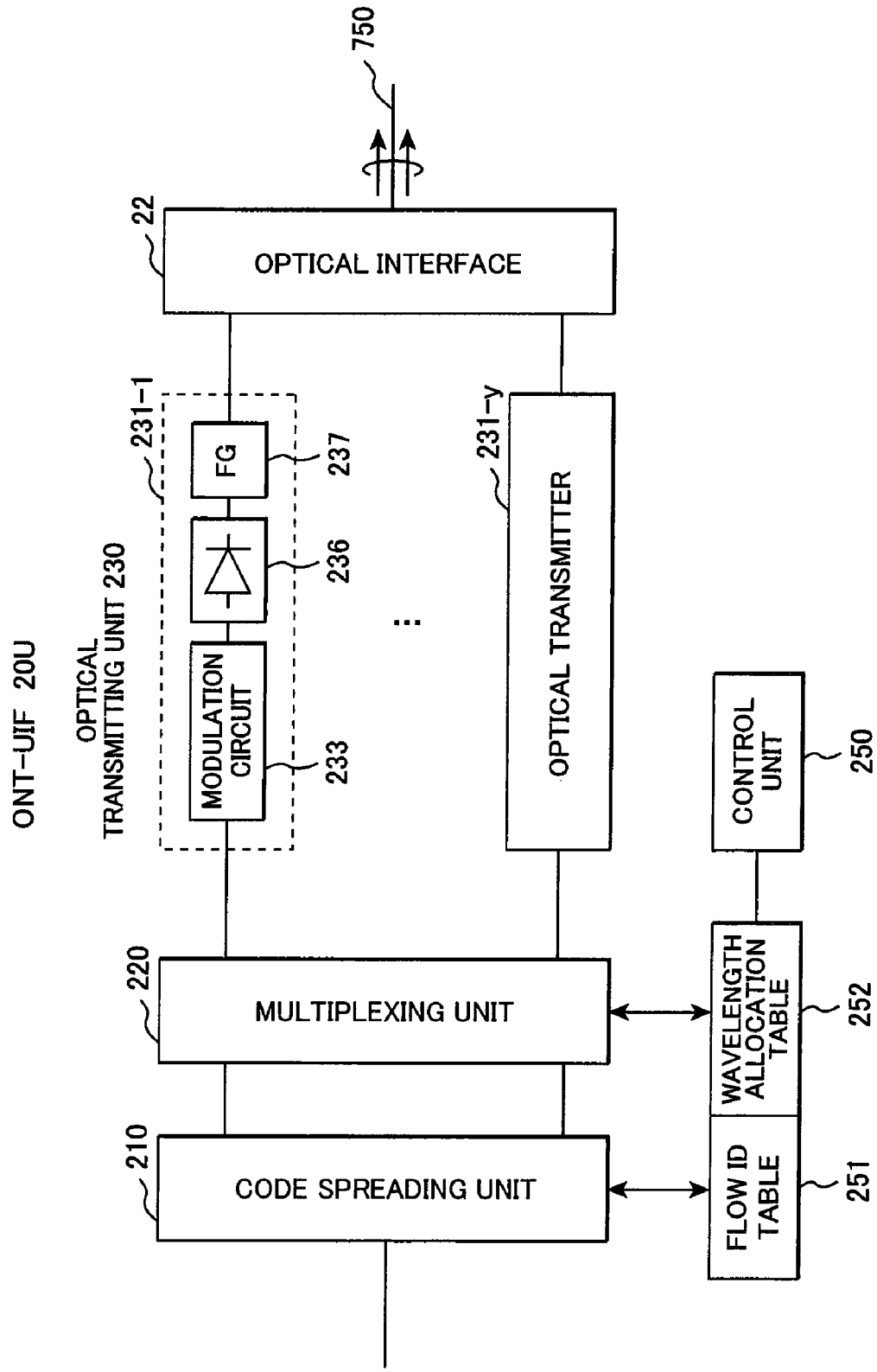
Figure 13:
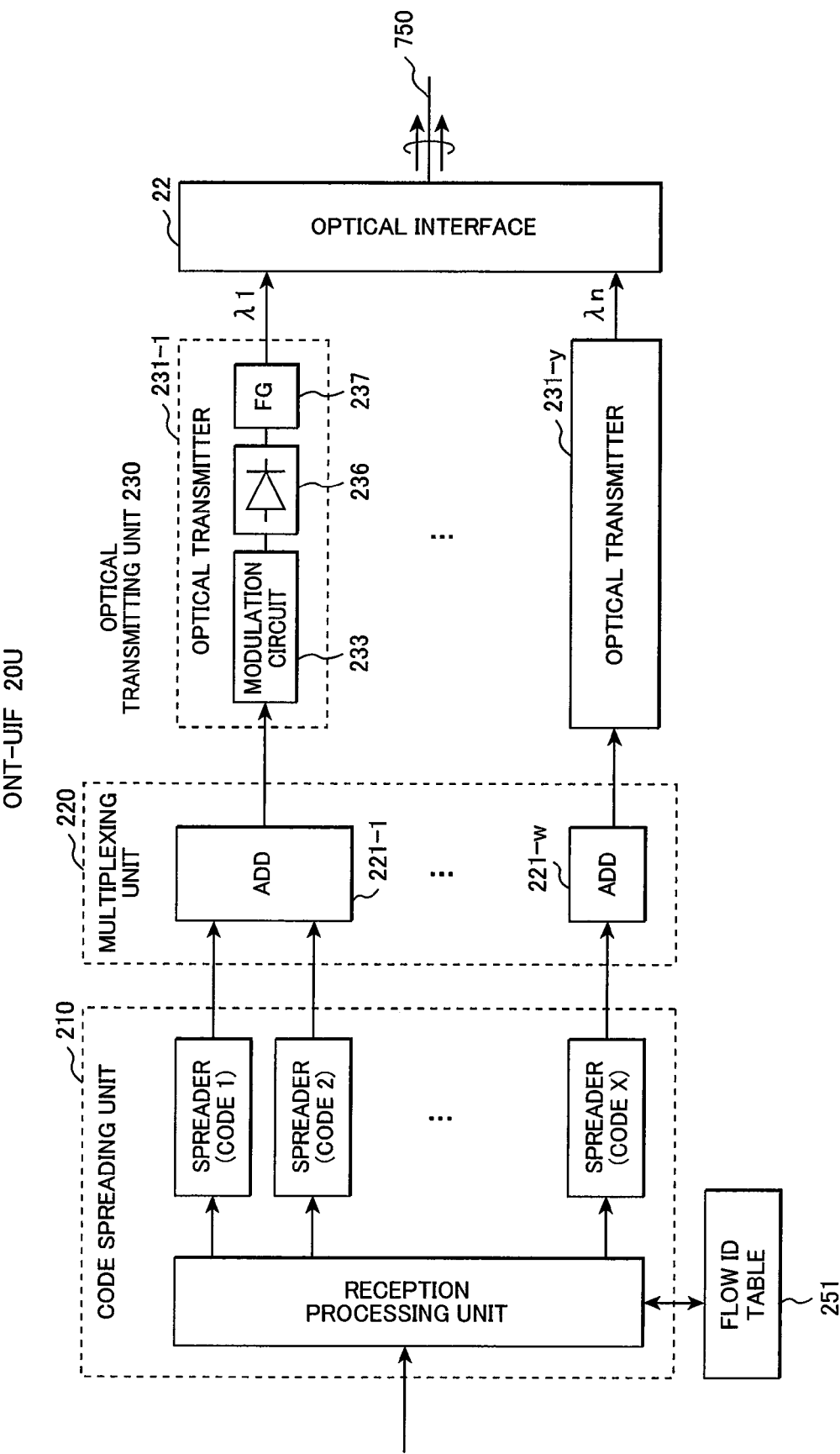
Figure 14:
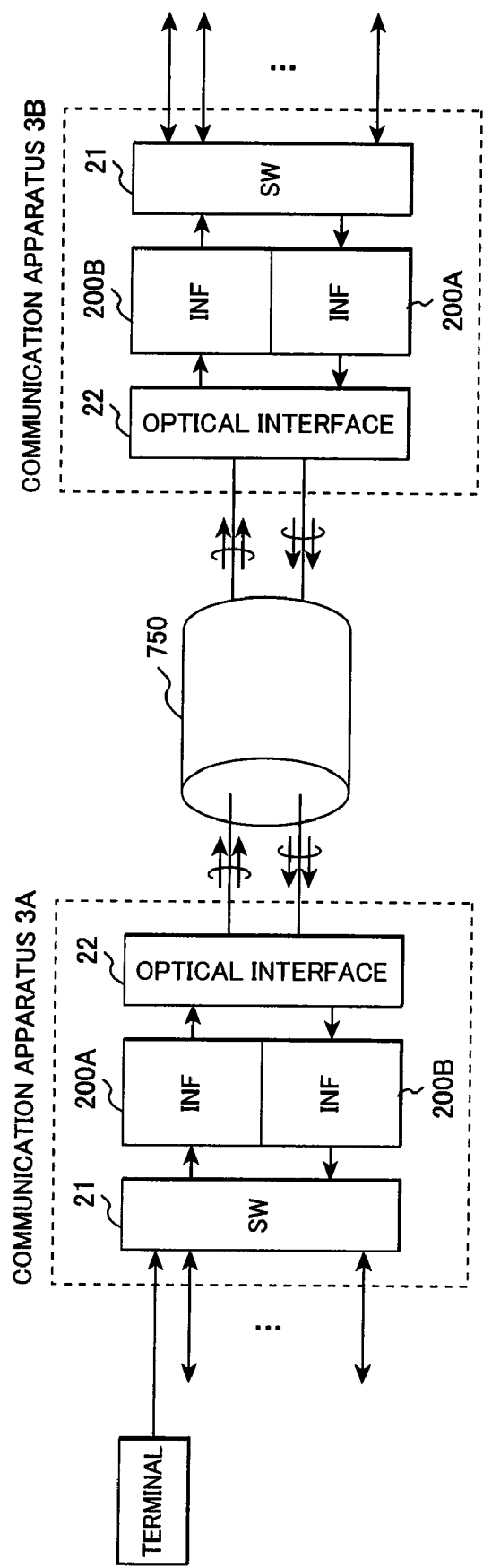

A figure showing the contents of a wavelength management table 253 provided in a control unit 250 of FIG. 10

FIG. 12

A figure showing further another embodiment of ONT-UIF 20U.

FIG. 13

A figure showing further another embodiment of ONT-UIF 20U.

FIG. 14

A figure showing the construction of a general optical signal multiplexing apparatus to which optical CDMA of the present invention is applied.

DESCRIPTION OF THE REFERENCE NUMERALS

1: OLT, 2: ONT, 10: PON interface board, 11: Optical interface, 10U: OLT-UIF, 10D: OLT-DIF, 12: Switch, 20U: ONT-UIF, 20D: ONT-DIF, 21: Switch, 22: Optical interface, 110: Optical receiver, 120: Despreading unit, 121: Despreader, 130: Transmission processing unit, 160: Code spreading unit, 161: Reception processing unit, 162: Code-division spreader, 170: Multiplexing unit, 180: Optical transmitting unit, 181: Optical transmitter, 150: Control unit, 151: Flow ID table, 152: Wavelength allocation table, 153: Management table, 210: Code spreading unit, 211: Reception processing unit, 212: Code-division spreader, 220: Multiplexing unit, 230: Optical transmitting unit, 231; Optical transmitter, 250: Control unit, 251: Flow ID table, 252: Wavelength allocation table, 260: Optical receiver, 270: Despreading unit, 271: despreader, 280: Transmission processing unit, 300: Switch, 500: Terminal

The invention claimed is:

1. An optical communication system comprising an optical line terminal (OLT) connected to a trunk optical fiber, and a plurality of optical network terminals (ONTs) connected to branched optical fibers diverged from said trunk optical fiber, wherein each of said ONTs comprises:

a plurality of code-division spreaders, each having a different spreading code as allocated by the OLT;

a reception processing unit that selectively distributes transmission data to the plurality of code-division spreaders;

at least one optical transmitter that transmits a signal spread with a code to said branched optical fiber as an optical signal of a carrier wavelength different from that of the other optical transmitters; and a signal multiplexing unit that selectively supplies output of the plurality of code-division spreaders to the optical transmitter, wherein each ONT converts the transmission data into a CDMA signal by the plurality of code-division spreaders having different spreading codes, and converts the CDMA signal into an optical signal by the optical transmitter having a carrier wavelength allocated by the OLT, wherein said OLT comprises:

an optical receiver that receives a wavelength-division-multiplexed CDMA signal from said trunk optical fiber and outputs an output signal; and a plurality of despreaders connected to the optical receiver and different in their spreading code, each of the despreaders reproducing a CDMA signal corresponding to its spreading code from the output signal of said optical receiver, and wherein each of said ONTs has a flow identifier table indicating the correspondence between flow identifiers of transmission data and spreading codes, and said reception processing unit correlates said transmission data and said code-division spreader according to the flow identifier table.

2. The optical communication system according to claim 1, wherein, each of said ONTs includes a plurality of optical transmitters different in their carrier wavelength, and said signal multiplexing unit selectively supplies outputs of the plurality of code-division spreaders to the plurality of optical transmitters; and wherein each of said ONTs converts said transmission data into a CDMA signal by said code-division spreader having a spreading code allocated by the OLT, and converts the CDMA signal into an optical signal by said optical transmitter having a carrier wavelength allocated from said OLT.

3. The optical communication system according to claim 1, wherein said OLT is provided with a management table for storing a carrier wavelength and a spreading code allocated to each of said ONTs, in association with an identifier of the ONT.

4. The optical communication system according to claim 1, wherein each of said optical transmitters is composed of a laser element adjustable its oscillation wavelength, and wherein each of said ONTs controls each of said laser elements so that the optical transmitter has a carrier wavelength allocated in advance.

5. The optical communication system according to claim 3, wherein each of said ONTs changes said oscillation wavelength by controlling temperature of each of said laser elements.

6. The optical communication system according to claim 2, wherein each of said ONTs has a wavelength allocation table indicating the correspondence between spreading codes and carrier wavelengths, and said signal multiplexing unit correlates said code-division spreaders and said optical transmitters according to the wavelength allocation table.

7. The optical communication system according to claim 2, wherein said OLT is provided with a management table for storing a carrier wavelength and a spreading code allocated to each of said ONTs, in association with an identifier of the ONT.

8. The optical communication system according to claim 2, wherein each of said optical transmitters is composed of a laser element adjustable its oscillation wavelength, and
wherein each of said ONTs controls each of said laser elements so that the optical transmitter has a carrier wavelength allocated in advance.

9. The optical communication system according to claim 7, wherein each of said ONTs changes said oscillation wavelength by controlling temperature of each of said laser elements.

10. An optical line terminal (OLT) connected to a trunk optical fiber in an optical communication system having a plurality of optical network terminals (ONTs) connected to branched optical fibers diverged from said trunk optical fiber, each of said ONTs having a plurality of code-division spreaders, each having a different spreading code; a reception processing unit that selectively distributes transmission data to the plurality of code-division spreaders; at least one optical transmitter that transmits a signal spread with a code to said branched optical fiber as an optical signal of a carrier wavelength different from that of the other optical transmitters; and a signal multiplexing unit that selectively supplies output of the plurality of code-division spreaders to the optical transmitter, wherein each ONT converts the transmission data into a CDMA signal by the plurality of code-division spreaders having different spreading codes, and converts the CDMA signal into an optical signal by the optical transmitter having a carrier wavelength allocated by the OLT,
    said OLT comprising:
    an optical receiver that receives a wavelength-division-multiplexed CDMA signal from said trunk optical fiber and outputs an output signal; and
    a plurality of despreaders connected to the optical receiver and different in their spreading code, each of the despreaders reproducing a CDMA signal corresponding to its spreading code from the output signal of said optical receiver,
    wherein the OLT allocates the different spreading codes to the plurality of code-division spreaders of each ONT, and
    wherein each of said ONTs has a flow identifier table indicating the correspondence between flow identifiers of transmission data and spreading codes, and said reception processing unit correlates said transmission data and said code-division spreader according to the flow identifier table.

11. An optical network terminal (ONT) in an optical communication system comprising an optical line terminal (OLT) connected to a trunk optical fiber, and having a plurality of optical network terminals (ONTs) connected to branched optical fibers diverged from said trunk optical fiber, the OLT having an optical receiver that receives a wavelength-division-multiplexed CDMA signal from said trunk optical fiber and outputs an output signal; and a plurality of despreaders connected to the optical receiver and different in their spreading code, each of the despreaders reproducing a CDMA signal corresponding to its spreading code from the output signal of said optical receiver,
    said ONT comprising:
    a plurality of code-division spreaders, each having a different spreading code as allocated by the OLT;
    a reception processing unit that selectively distributes transmission data to the plurality of code-division spreaders;
    at least one optical transmitter that transmits a signal spread with a code to said branched optical fiber as an optical signal of a carrier wavelength different from that of the other optical transmitters; and
    a signal multiplexing unit that selectively supplies output of the plurality of code-division spreaders to the optical transmitter,
    wherein the ONT converts the transmission data into a CDMA signal by the plurality of code-division spreaders having different spreading codes, and converts the CDMA signal into an optical signal by the optical transmitter having a carrier wavelength allocated by the OLT, and
    wherein each of said ONTs has a flow identifier table indicating the correspondence between flow identifiers of transmission data and spreading codes, and said reception processing unit correlates said transmission data and said code-division spreader according to the flow identifier table.

* * * * *